United States Patent [19]

Fannin et al.

[11] Patent Number: 4,828,229

[45] Date of Patent: May 9, 1989

[54] HYDRAULIC ACTUATOR FOR ACTIVE RIDE SUSPENSION

[75] Inventors: Wayne V. Fannin; William C. Kruckemeyer, both of Xenia, Ohio; Scott R. Kloess, Rochester Hills, Mich.

[73] Assignee: General Motors Corporation, Detroit, Mich.

[21] Appl. No.: 121,026

[22] Filed: Nov. 16, 1987

[51] Int. Cl.$^4$ ............................................... F16F 9/10
[52] U.S. Cl. ............................... 267/64.25; 188/299; 267/34; 280/707
[58] Field of Search .................. 188/299; 267/34, 35, 267/64.15, 64.16, 64.17, 64.25, 64.26, 64.28; 280/707, 709, 710, DIG. 1

[56] References Cited

U.S. PATENT DOCUMENTS 4,620,619 11/1986 Emura et al. .................. 188/299 X
4,753,328 6/1988 Williams et al. .................. 188/299

Primary Examiner—Duane A. Reger
Attorney, Agent, or Firm—Charles R. White

[57] ABSTRACT

An oil pressurized telescoping actuator for active ride vehicle suspension having a folded dual piston design with an inner piston stroking within the rod of an outer piston to foreshorten overall length. A special universal joint provided for a larger tolerance so that three bearing surfaces encounter will not encounter binding. The upper mount accommodates the upper end of the actuator with extends therethrough to further foreshorten the unit. The entire unit is jacketed to provide a reservoir connected to a drain line so that leakage oil can be pressurized by a pump into the system for pressurized feed into the actuator for powered expansion and contraction of the actuator for level ride for all vehicle maneuvers.

7 Claims, 2 Drawing Sheets

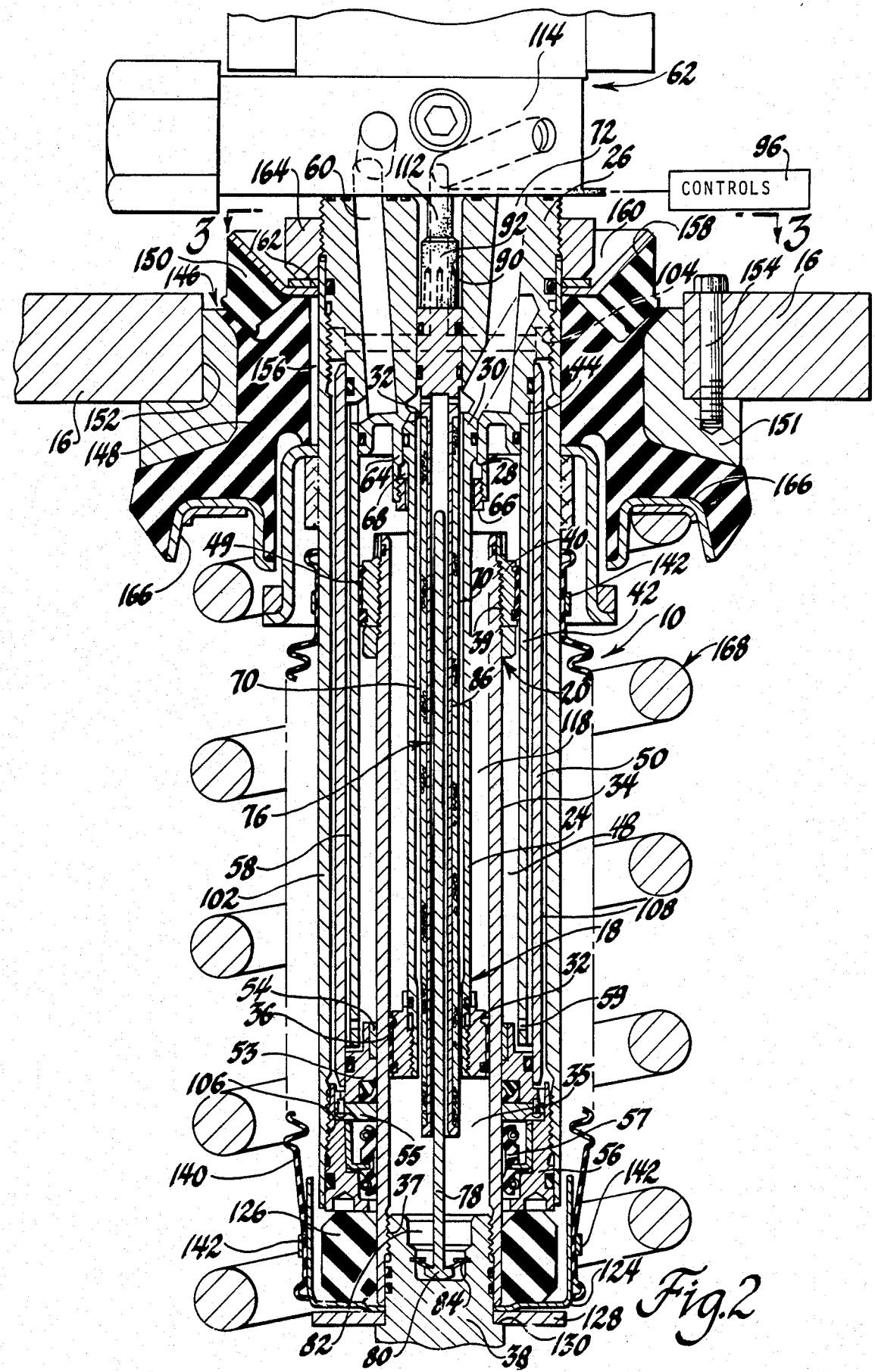

HYDRAULIC ACTUATOR FOR ACTIVE RIDE SUSPENSION

BACKGROUND OF THE INVENTION

This invention relates to active ride suspension and more particularly to hydraulically powered actuator units used to adjustably mount the vehicle road wheels to the vehicle body and to control the plane of the vehicle through all handling maneuvers.

FIELD OF THE INVENTION

In order to actively control the attitude of the body of a vehicle with respect to the roadway, special dual acting hydraulic actuators have been proposed to control the plane of the vehicle body through a wide range of handling maneuvers including cornering, acceleration and braking without impairing the basic ride of the vehicle. These actuators are high pressure oil adjustable units operatively disposed between the road wheels and support structure in the vehicle body. An example of such an actuator is disclosed in U.S. Ser. No. 186,754, filed Apr. 26, 1988, a continuation of U.S. Ser. No. 003,831, filed Jan. 8, 1987, abandoned, both applications entitled DUAL ACTING HYDRAULIC ACTUATOR FOR ACTIVE SUSPENSION SYSTEM, both applications assigned to the assignee of this invention and hereby incorporated by reference.

SUMMARY OF THE INVENTION

The present invention is of the general category of the active suspension actuator of the prior application Ser. No. 186,754 referenced above and provides a new and improved actuator which will control the vehicle body attitude in any selected plane and preferably a substantially level plane through vehicle handling maneuvers including high G load cornering without impairing the basic ride desired for the particular vehicle such as for sports car operation. The present invention features a new and improved folded hydraulic actuator with equal area pistons for the road wheels that provides for a shortened overall length which length is further minimized by mounting the upper end of the unit through the upper mount. In addition to the effective shortened length provided by the "through-mount" feature of the present invention, there is improved environment routing of hydraulic lines and electrical wiring used in the controls for power adjusting actuator length and vehicle body attitude. This routing is accordingly through protected areas such as the engine compartment or covered beams instead of wheel well routings. This invention further features a compliant joint to compensate for dimensional tolerances in at least three primary bearing surfaces to eliminate the high cost to quantity produce actuators with precisely aligned telescopic tubing and pistons. An additional feature of the present invention is the provision of new and improved sump tubing enveloping the powered telescopic components so that oil leakage from sealed high pressure extension and contraction chambers as well as other areas in the actuator is trapped for delivery to sump. This not only conserves oil an increases efficiency, but also prevents contamination and oiling of roadways and parking areas.

These and other features, objects and advantages will be more apparent from the drawings and the detailed description.

BRIEF DESCRIPTION OF THE DRAWING

FIG. 2 is a cross-sectional view taken along lines 2—2 of FIG. 1.

DESCRIPTION OF THE PREFERRED EMBODIMENT

Figure 1:
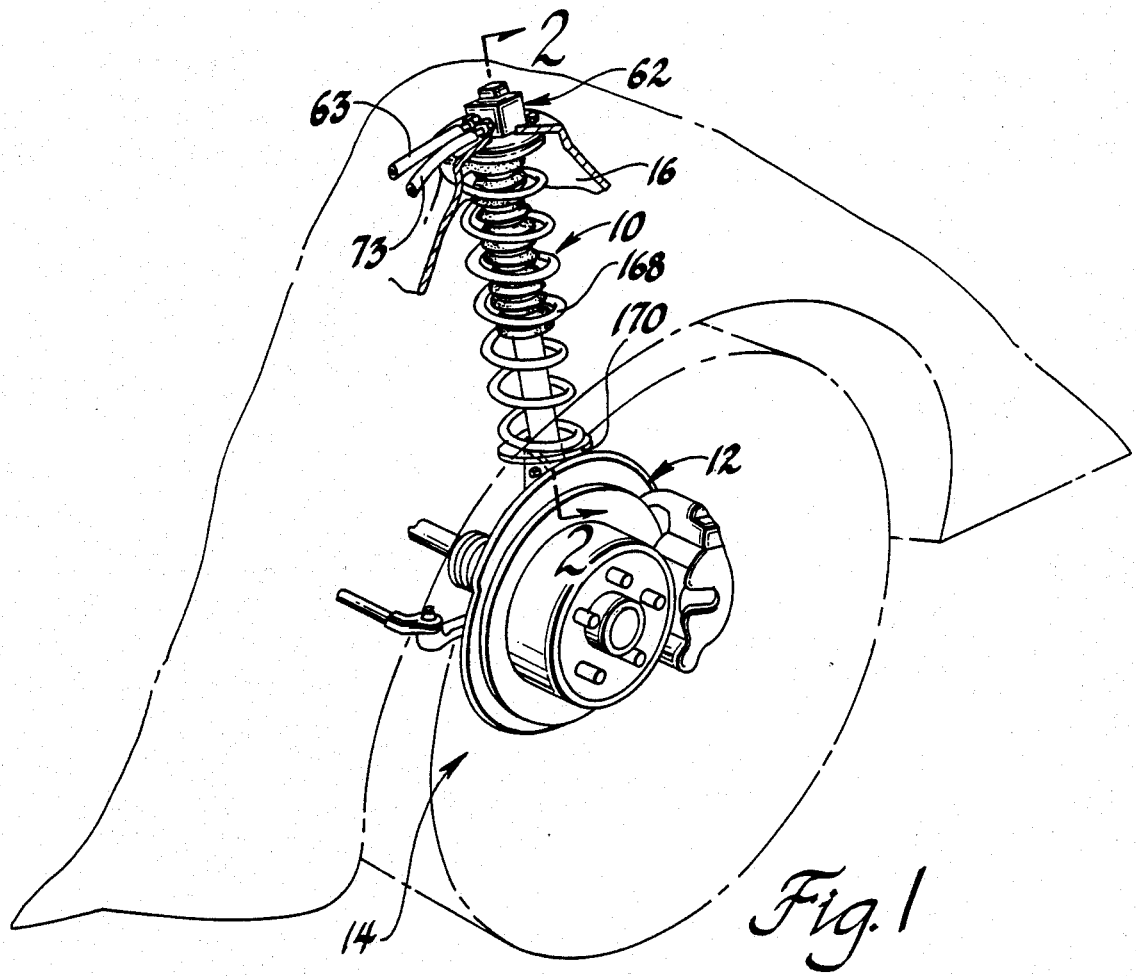
FIG. 1 is a pictorial view of a portion of a vehicle illustrating a hydraulic powered actuator of this invention operatively disposed between a road wheel assembly and support structure in the vehicle body.

Turning now in greater detail to the drawing, there is shown in FIGS. 1 and 2, an active ride suspension strut 10 operatively connected between the steering knuckle and hub assembly 12 of a road wheel 14 and a mounting tower 16 or other support structure in the bodywork of a vehicle. The active ride suspension strut 10 is a high pressure oil adjustable unit having inverted or folded piston assemblies (one piston assembly within the other) to, in effect, foreshorten overall length so that it may be readily used in a wide range of vehicular applications including those that employ MacPherson type struts. The internals of the active ride strut 10, shown in FIG. 2, comprise a pair of telescopic piston assemblies formed by a downwardly extending expansion piston assembly 18 and an upwardly extending contraction piston assembly 20. The expansion piston assembly 18 is telescopically mounted within the contractions piston assembly 20 and has a hollow tubular piston rod 24 which is connected at its upper end to a cylindrical end cap 26 by a ball and socket compliant joint 28. This pivot joint is effective to allow limited pivotal movement of the piston rod relative to cap 26 during actuator operation to compensate for any misalignment of the bearing surfaces or components of the actuator including elements of the piston assemblies. From ball 30 of the compliant joint 28, the rod 24 extends downwardly coaxially coaxial with the axis of unit 10 into threaded connection with the expansion piston 32 which strokes in a hollow rod 34 of the upwardly extending contraction piston assembly 20 and cooperates with piston rod 24 to form expansion chamber 35. The band type annular seal 36 carried on the periphery at piston 32 slidably and sealingly engages the inner wall of contraction piston rod 34 to form the first of the above-mentioned bearing components. As shown, the contraction piston rod 34 extends upwardly from a threaded connection 37 with a lower connector rod 38 into threaded connection at 39 with a contraction piston 40. The contraction piston 40 is slidably mounted in an elongated cylinder tube 42 that is connected to a shouldered inner end 44 of the end cap 26 and cooperates therewith to form a contraction chamber 48. The piston 40 also has a band type annular seal 49 slidably and sealingly contacting the inner wall of the cylinder tube 42 to define a second of the bearing components.

The strut 10 also has an outer pressure tube 50 connected with a shouldered end portion of the upper end cap 26 and extends downwardly therefrom to a lower bearing and closure assembly 53. The piston rod 34 slides through the inner cylindrical wall 54 of the sleeve bearing 54 of closure assembly 53 which defines a third of the bearings referenced above. The closure assembly 53 is secured to a washer-like plate 55 that fits in a shouldered recess of a lower cup-like end plate 56. This end plate has a shouldered inner recess in which a seal assembly 57 is operatively mounted to provide sealing engagement with the outer periphery of the piston rod 34.

Figure 3:
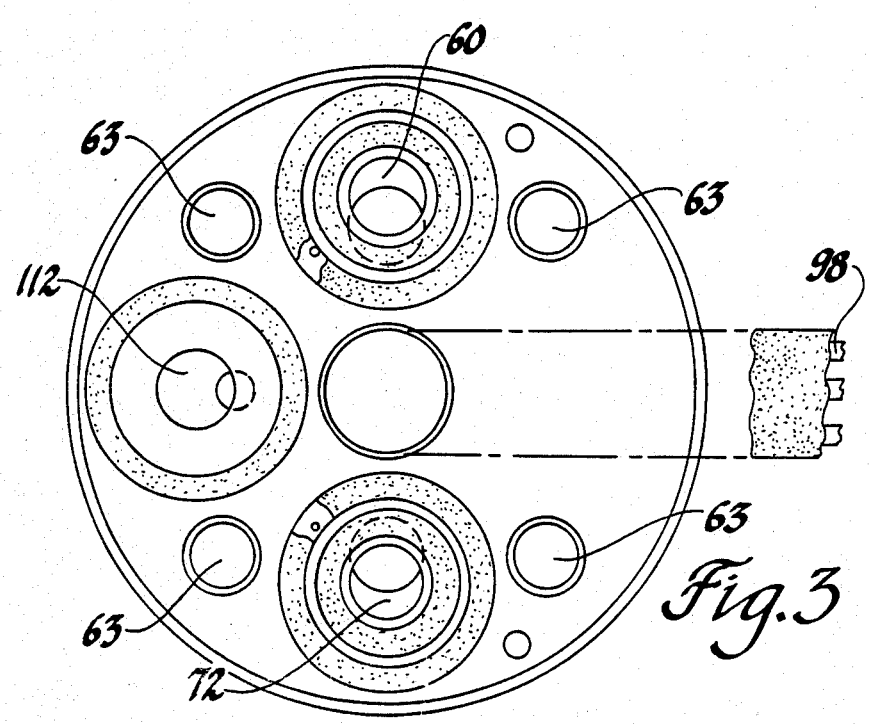
FIG. 3 is a view taken along lines 3—3 of FIG. 2.

The cylindrical space 58 between the outer pressure tube 50 and the cylinder tube 42 provides a fluid passage connected at its lower end to contraction chamber 48 by radial openings 59 in the lower end of the cylinder tube 42. At its upper end the fluid passage provided by cylindrical space 58 is connected to a first bore 60 in the upper end cap 26 that in turn is hydraulically connected to controls through a valve and adapter assembly 62 and external line 63. The valve adapter assembly which is mounted to the top of the end cap by screws 65 as shown in FIG. 3.

The socket 3 for the ball and socket pivot joint 28 is formed in a downwardly extending neck 64 of the end cap 26 and is retained in the neck by a nut 66 which threads into the interior wall of the neck. An annular 0-ring seal 68 is positioned in the neck between the underside of ball 30 and nut 66 to block the passage of fluid therethrough. An axial passage 70 extending through ball 30, the piston rod 24 and piston 32 connects expansion chamber 35 to a second bore 72 in the end cap 26. Bore 72 is operatively connected by the valve assembly and external line 73 to the hydraulic controls by which the unit is pressurized for expansion or contraction.

To control height, this actuator incorporates a height sensor assembly 76 comprising an elongated rod-like shutter 78 having a lower head 80 mounted in a recess 82 in the upper end of rod 38 by a suitable retainer 84. The shutter being fixed to the rod 38 can stroke within a cylindrical and elongated linear variable inductance transducer 86 of the height sensor assembly which has at its upper and a cylindrical terminal block 88' fixed in a third and centralized bore 90 in the end cap 26. The terminal block has projecting terminals 92 which fit within the receptor terminals of a socket 94 and connect to controls 96 by leads 98. The controls correspond to those in U.S. Ser. No. 186,754 referenced above and respond to the position of the shutter 78 in the linear variable inductance transducer 86 to provide appropriate pressures to the extension and contraction chambers 35 and 18 of the actuator units 10. These units are preferably positioned at the corners of the vehicle to adjustably support the road wheels with respect to the vehicle body. During vehicle operation when pressure oil is supplied to or oil is exhausted from appropriate extension and contraction chambers in accordance with signals fed to the controls, the vehicle is maintained level through cornering maneuvers, braking, acceleration and basically unchanged from straight ahead driving.

To prevent leaking, this high pressure unit 10 incorporates an outer cylindrical jacket or reservoir tube 102 that encompasses the outer pressure tube 50 of this unit. The upper end of reservoir tube 102 is threaded at 104 to the end cap 26 and the lower end thereof is threadably connected at 106 to the outer periphery of the end plate 56. The reservoir space 108 between the reservoir tube and the outer pressure tube 50 communicates with the drain lines 110, 112 and to the outlet port 114 and from outlet port 114 and by hydraulic line 116 to a pump sump connected to the controls 96. The variable volume inner chamber 118 formed by the cylindrical space between the upper end of the two pistons 32 and 40 is connected to the drain line 110 by line 120. With this construction, any leakage past the various sealed components will flow into the drain system to avoid contamination of parking areas and roadways and to ensure that oil is effectively utilized.

Operatively mounted in a retainer cup 124 at the lower end of the unit 10 is a generally toroidal spring 126 of rubber or rubber like material to provide for damping the ride motions of the vehicle. Cup 124 is mounted on a washer like seat 128 fitted on shoulder 130 of rod 38. An elastomer convoluted boot 140 which is attached to the cup 126 by retainer ring 142 and from this cup the boot extends upwardly along the outer periphery of the reservoir tube 102 where the upper end is secured by a constricted band 142.

As pointed out above, the overall wheel mounting length of the actuator 10 is in effect reduced by the mounting arrangement of the upper end of the actuator to the support structure within the vehicle. This is accomplished through a multi-part upper mount 146 that comprises primary and secondary rubber annuli 148, 150. An annular shouldered metallic retainer 151 is bonded or otherwise secured to the outer periphery of the primary annulus 148 and fits within the opening 152 of bodywork 16. Screws 154 thread through the bodywork into the annular shoulder of retainer 151 to secure the upper mount to the vehicle. The primary annulus 148 has a central opening 156 through which the reservoir tube 102 and end cap 26 extend. The secondary rubber annulus 150 fits on top of the primary annulus as shown and defines a dished conical upper surface 158 on which a conical retainer 160 is fitted. This retainer and the upper mount rubber are secured in place by washer 162 and by a nut 164 which threads onto the end cap 26. The lower part of the primary mount rubber 148 receives an annular seat 166 for an upper end of a helical suspension spring 168 which coils around the outside of the unit to a lower seat 170 (FIG. 1) that is fastened to the connector member 38 or other suitable support which is secured to the hub assembly 12 to provide for the spring suspension of the vehicle.

The vehicle is primarily supported by the suspension springs at the four corners of the vehicle. In the event that the vehicle begins to lean such as when cornering the height sensor will trigger the active ride controls to appropriately exhaust and pressurize the extension and contraction chambers in the four corners of the vehicle to quickly and actively extend and contract the actuator units 10 to keep the vehicle operating in a level plane. In the same manner, the vehicle will be kept level during positive and negative vehicle accelerating such as might occur on fast starts or braking. Accordingly, with this invention, the ride is active and the vehicle will operate in a substantially level plane for all maneuvers.

With the present invention, the compliant joint 28 allows for a wide range of production tolerances between the linearly spaced, bearing surfaces of the contraction piston and the cylinder tube, the expansion piston and the inner wall of the contraction piston tube and between the sleeve bearing and the contraction piston tube. The compliant joint compensates for any misalignment of the three bearing surfaces and compensates for dimensional tolerances eliminating the need for precision alignment between bearing surfaces.

With the new enveloping outer reservoir tube, high pressure oil is leak trapped and any leakage past the seals is to sump for reuse in the system.

While a preferred embodiment of this invention has been shown and described to illustrate the invention, other embodiments will be now apparent to those skilled in the art. Accordingly, the scope of the invention is set forth in the following claims.

The embodiments of the invention in which an exclusive property or privilege is claimed are defined as follows:

1. A ride controlling telescopically extendible and contractible fluid pressurized actuator for adjustably mounting a road wheel assembly to support structure in a vehicle that has an opening therethrough comprising an upper mount assembly extending through said opening and operatively secured to said support structure, an upper end cap mounted within said upper mount assembly and extending through said opening in said support structure, an expansion piston assembly having a piston rod connected at an upper end thereof to said end cap and extending downwardly from said end cap to a terminal end, an expansion piston secured to said terminal end, a cylinder tube connected at one end to said end cap and extending downwardly therefrom to a lower closure and bearing assembly, a contraction piston assembly operatively mounted in said cylinder tube and having a tubular rod extending through said lower closure and bearing assembly receiving said expansion piston, an expansion chamber formed by said expansion piston and said rod of said contraction piston assembly, said tubular rod of said contraction piston assembly extending in telescopic relationship with said rod of said expansion piston assembly into connection with a contraction piston, a contraction chamber formed by said contraction piston and between said rod of said contraction piston assembly and said cylinder tube, and passage means to selectively supply high pressure fluid to said contraction and expansion chambers to thereby control the length of said actuator and the height of the vehicle with respect to a supporting surface for said road wheel.

2. The actuator of claim 1 above wherein said actuator is encased by an outer tube to form a reservoir space to collect leakage oil from said contraction and expansion pressure chambers.

3. The actuator of claim 1 wherein said connection between said first mentioned piston rod and said end cap is provided by articulation joint means to compensate for bearing misalignments formed between the contraction piston and said cylinder tube and between said expansion piston and said rod of said contraction piston and between said rod of said contraction piston and said lower closure and bearing assembly.

4. The actuator of claim 1 wherein said end cap of said unit extends through said upper mount and is secured thereto by an annular connector member securely fastened to said support structure.

5. A ride controlling and oil pressure extendible and contractible actuator for adjustably mounting a road wheel assembly to support structure in a vehicle comprising an upper mount assembly extending through an opening in said support structure, fastener means securing said upper mount assembly to said support structure and within said opening, a first tubular member having an upper end cap extending through and secured to said upper mount, a second tubular member connected to said end cap and extending into said first tubular member, said first tubular member having a closure member at one end thereof slidably receiving said second tubular member, a piston assembly having a hollow piston rod operatively secured at one end to said road wheel assembly and extending upwardly into said second tubular member, a piston secured to the other end of said hollow piston rod having a bearing in sliding contact with said second tubular member, said closure member having a bearing in sliding contact with said hollow piston rod, a second piston slidably mounted within said hollow piston rod, a piston rod operatively secured to said cap and extending therefrom into connection with said second piston and means for supplying pressure fluid to said piston assembly for extending and contracting said actuator to maintain the attitude of said vehicle.

6. The actuator of claim 5 wherein pivot joint means operatively interconnects said last mentioned piston rod to said cap to allow said second piston to stroke within said hollow piston rod without binding.

7. The actuator of claim 5 wherein said actuator includes a jacket means operatively secured to said end cap and encompassing said tubular members to form a reservoir for receiving leakage fluid supplied to said pistons.

* * * * *